United States Patent Office 3,368,997
Patented Feb. 13, 1968

3,368,997
COMPOSITION AND METHOD FOR THE STABILIZATION OF ORGANIC MATERIAL
David Albert Gordon, Scarsdale, N.Y., assignor to Geigy Chemical Corporation, Greenburgh, N.Y., a corporation of Delaware
No Drawing. Filed Nov. 15, 1965, Ser. No. 507,703
4 Claims. (Cl. 260—45.8)

ABSTRACT OF THE DISCLOSURE

Synthetic polymers, particularly polystyrene, are protected from deterioration due to light by the addition of from about 0.001 to about 5% by weight of a stabilizer composition of certain benzotriazoles and esters of hindered phenolic substituted lower alkanoic acids. A preferred stabilizer composition consists of 60% by weight of 2(2'-hydroxy-5'-methylphenyl)benzotriazole and 40% by weight of methyl β-(3,5-di-t-butyl-4-hydroxyphenyl) propionate.

---

This invention relates to the stabilization of organic material normally tending to deteriorate. In particular the invention relates to the protection of synthetic polymers against the harmful degradative effects, such as discoloration, caused by exposure to light, especially ultraviolet light.

Single additives used for the protection of polymers against degradation due to exposure to light are known to the industry. An example of the use of such a compound to protect polymers against discoloration and other degradative effects from exposure to light is described in United States Patent 3,004,896.

Other additives which are comprised of a combination of two or more compounds have also been employed to protect synthetic polymers from the deleterious effects of exposure to light. One such composition that has previously been used with the achievement of only limited protection of polymers is a combination of 65% dimethylanisylidenmalonate and 35% tri-tert-butylphenol.

All of the prior attempts to find a truly effective, and economically practical means to stabilize synthetic polymers against the harmful effects of exposure to light have attained only extremely limited success. In most instances, the amount of previously known stabilizers that would be required to be added to the polymers to obtain even a minimally satisfactory result made the cost of the end product economically prohibitive.

I have now found an extremely effective stabilizer for the protection of synthetic polymers from the harmful effects of exposure to light. This stabilizer is a combination of from about 80% to about 20% by weight of a compound of the formula:

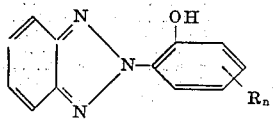

wherein R is hydrogen, lower alkyl, lower alkoxy, lower carbalkoxy, cyclohexyl, phenyl or halogen, and wherein n is an intger of from 0 to 3, and from about 80% to about 20% by weight of the compound of the formula:

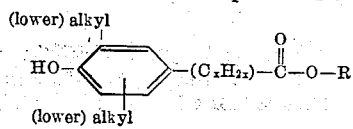

a value of 0 to 6, and R represents an alkyl of from 1 to 30 carbon atoms; lower alkyl is straight and branched chains of 1–8 C.

A preferred embodiment of the stabilizer of this invention is a combination of methyl 3-(3',5'-di-tert-butyl-4'-hydroxyphenyl)propionate and 2-(2'-hydroxy-5'-methylphenyl)benzotriazole in the foregoing proportions.

The stabilizer composition of this invention may be employed in concentrations between about 0.001 and about 5% by weight. The preferred range, balancing such factors as the degree of effectiveness required, duration of stabilization, particular substrate, toxicity, availability and cost of raw material, is generally between about 0.1% and 1.0% by weight.

While any ratio of the components of the stabilizer of the invention between about 80/20 and 20/80 is useful when the stabilizer is incorporated in the substrate in the concentrations mentioned, the preferred ratio is between about 60/40 and about 40/60.

The stabilizer of this invention is suitable for the protection of many synthetic polymers from the deleterious effects of light. Homopolymers, copolymers and mixtures thereof are embraced within the scope of substrates which may be stabilized by the stabilizer composition of this invention among which may be mentioned polystyrene, including homopolystyrene and copolymers with acrylonitrile and/or butadiene; vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins; polyurethanes such as are prepared from polyols and organic polyisocyanates; polyamides such as polyhexamethylene adipamide; polyesters such as polymethylene terephthalates; polycarbonates; polyacetals; and polyethyleneoxide.

The data recorded in the Tables I–VI, infra, clearly indicates the remarkable effectives of the stabilizer composition of this invention in protecting polystyrene from degradation due to light exposure.

It is understood of course that besides the stabilizer of this invention the polymers treated may also contain many other additives commonly employed with synthetic polymers to obtain various desired properties.

In the following Tables I–VI the degree of discoloration after exposure to ultraviolet light, is given both in terms of the yellowness index (Y.I) and in percent transmission. The former is calculated from tristimulus values (X, Y and Z) as described in A.S.T.M. Method D1925–62T. Transmission in terms of percent were measured at 420 mμ. The additives were dry blended with polystyrene for 30 minutes on a roller mill, extruded and pelletized. The pellets thus obtained were then injection molded into two inch square specimens of 100 mil thickness. The samples were exposed on a revolving turntable two inches from a bank of 36 Sylvania F 40 BL black lights. Transmission and X, Y and Z values were measured every 350 hours of exposure by means of a General Electric Recording Spectrophotometer.

Composition A is a mixture of about 65% dimethylanisylidenmalonate and 35% tri-tert-butylphenol.

Compound B is methyl 3-(3',5'-di-tert-butyl-4'-hydroxyphenyl)propionate.

Compound C is 2-(2'-hydroxy-5'-methylphenyl)benzotriazole.

TABLE I.—COMPOSITION A

| Percent A | 0 hrs. | 350 hrs. | 700 hrs. | 1,050 hrs. | 1,400 hrs. | 1,750 hrs. |
|---|---|---|---|---|---|---|
| 0.20 | YI-3.8 Percent T, 420-83.5. | YI-3.2 Percent T, 420-85.3. | YI-3.6 Percent T, 420-84.7. | YI-5.4 Percent T, 420-80.1. | YI-9.0 Percent T, 420-74.2. | YI-15.1 Percent T, 420-64.3. |
| 0.25 | YI-3.5 Percent T, 420-83.2. | YI-3.3 Percent T, 420-84.8. | YI-3.1 Percent T, 420-84.5. | YI-3.9 Percent T, 420-81.1. | YI-7.5 Percent T, 420-76.2. | YI-15.4 Percent T, 420-64.2. |

TABLE II.—CONTROL POLYSTYRENE

| Percent Additive | 0 hrs. | 350 hrs. | 700 hrs. | 1,050 hrs. | 1,400 hrs. | 1,750 hrs. |
|---|---|---|---|---|---|---|
| 0 | YI-2.4 Percent T, 420-85.6. | YI-6.4 Percent T, 420-78.3. | YI-8.9 Percent T, 420-72.8. | YI-18.7 Percent T, 420-58.4. | YI-22.0 Percent T, 420-51.7. | YI-28.6 Percent T, 420-42.8. |

TABLE III.—COMPOUND B

| Percent B | 0 hrs. | 350 hrs. | 700 hrs. | 1,050 hrs. | 1,400 hrs. | 1,750 hrs. |
|---|---|---|---|---|---|---|
| 0.25 | YI-2.2 Percent T, 420-86.6. | YI-3.3 Percent T, 420-84.3. | YI-4.1 Percent T, 420-82.5. | YI-8.1 Percent T, 420-74.0. | YI-12.1 Percent T, 420-67.9. | YI-15.8 Percent T, 420-62.3. |

TABLE IV.—COMPOUND C

| Percent C | 0 hrs. | 350 hrs. | 700 hrs. | 1,050 hrs. | 1,400 hrs. | 1,750 hrs. |
|---|---|---|---|---|---|---|
| 0.20 | YI-3.4 Percent T, 420-84.0. | YI-2.7 Percent T, 420-85.8. | YI-3.1 Percent T, 420-84.4. | YI-1.5 Percent T, 420-82.4. | YI-7.2 Percent T, 420-77.3. | YI-14.7 Percent T, 420-65.8. |
| 0.25 | YI-3.2 Percent T, 420-84.6. | YI-2.7 Percent T, 420-85.6. | YI-2.8 Percent T, 420-85.4. | YI-2.7 Percent T, 420-82.8. | YI-7.0 Percent T, 420-77.4. | YI-14.3 Percent T, 420-65.7. |
| 0.30 | YI-3.4 Percent T, 420-84.3. | YI-2.7 Percent T, 420-85.8. | YI-2.5 Percent T, 420-85.0. | YI-2.2 Percent T, 420-83.5. | YI-6.1 Percent T, 420-79.4. | YI-12.3 Percent T, 420-67.9. |
| 0.35 | YI-3.2 Percent T, 420-83.4. | YI-2.7 Percent T, 420-85.7. | YI-2.8 Percent T, 420-85.0. | YI-2.9 Percent T, 420-83.7. | YI-5.8 Percent T, 420-79.7. | YI-12.0 Percent T, 420-69.6. |

TABLE V.—COMBINATION OF 60% COMPOUND C AND 40% COMPOUND B

| Percent Combination | 0 hrs. | 350 hrs. | 700 hrs. | 1,050 hrs. | 1,400 hrs. | 1,750 hrs. |
|---|---|---|---|---|---|---|
| 0.20 | YI-3.0 Percent T, 420-83.9. | YI-2.5 Percent T, 420-86.1. | YI-2.2 Percent T, 420-85.9. | YI-2.1 Percent T, 420-83.9. | YI-4.3 Percent T, 420-82.4. | YI-9.7 Percent T, 420-73.2. |
| 0.25 | YI-3.1 Percent T, 420-83.9. | YI-2.5 Percent T, 420-86.4. | YI-2.1 Percent T, 420-85.9. | YI-1.3 Percent T, 420-85.3. | YI-4.6 Percent T, 420-81.9. | YI-9.1 Percent T, 420-75.3. |
| 0.30 | YI-3.1 Percent T, 420-85.1. | YI-2.7 Percent T, 420-86.2. | YI-2.8 Percent T, 420-86.2. | YI-1.4 Percent T, 420-85.3. | YI-4.0 Percent T, 420-83.5. | YI-7.7 Percent T, 420-76.5. |
| 0.35 | YI-3.0 Percent T, 420-83.7. | YI-2.4 Percent T, 420-86.3. | YI-2.7 Percent T, 420-86.3. | YI-2.2 Percent T, 420-85.3. | YI-3.2 Percent T, 420-84.9. | YI-7.4 Percent T, 420-78.5. |

TABLE VI.—COMBINATION OF COMPOUND C AND COMPOUND B IN VARYING RATIOS AT 0.25% CONCENTRATION

| Ratio C/B | 0 hrs. | 350 hrs. | 700 hrs. | 1,050 hrs. | 1,400 hrs. | 1,750 hrs. |
|---|---|---|---|---|---|---|
| 70/30 | YI-3.4 Percent T, 420-83.5. | YI-2.7 Percent T, 420-86.2. | YI-2.7 Percent T, 420-86.4. | YI-2.6 Percent T, 420-85.1. | YI-4.5 Percent T, 420-82.4. | YI-9.7 Percent T, 420-73.9. |
| 50/50 | YI-3.0 Percent T, 420-85.6. | YI-2.1 Percent T, 420-86.5. | YI-2.4 Percent T, 420-86.9. | YI-2.0 Percent T, 420-85.3. | YI-4.5 Percent T, 420-82.6. | YI-8.0 Percent T, 420-76.0. |
| 40/60 | YI-2.3 Percent T, 420-85.8. | YI-2.1 Percent T, 420-87.0. | YI-2.0 Percent T, 420-87.6. | YI-2.4 Percent T, 420-85.4. | YI-4.2 Percent T, 420-82.4. | YI-8.2 Percent T, 420-75.9. |
| 30/70 | YI-3.3 Percent T, 420-84.3. | YI-2.2 Percent T, 420-86.5. | YI-2.5 Percent T, 420-86.8. | YI-3.4 Percent T, 420-84.0. | YI-4.5 Percent T, 420-82.2. | YI-8.4 Percent T, 420-75.7. |

As can be seen from the results recorded in the foregoing tables, the combination stabilizer of this invention has a truly remarkable effect on the stabilization of organic material against the detrimental effects of exposure to light.

The common industry standard is that a yellow index value of 15 is regarded as the point of failure in these tests.

Referring to Table I after exposure for 1750 hours the samples of polystyrene containing Composition A at concentrations of 0.20% and 0.25% respectively have corresponding yellow index values of 15.1 and 15.4 and thus have failed.

Table II shows that polystyrene without any stabilizing additive fails after less than 1050 hours exposure.

Table III indicates that a 0.25% concentration of methyl 3-(3',5'-di-tert-butyl-4'-hydroxyphenyl)propionate in polystyrene does not protect the polystyrene from yellowing beyond a yellow index of 15 (failure) after 1750 hours exposure.

Table IV illustrates that at concentrations of 0.20% and 0.25% after 1750 hours exposure 2-(2'-hydroxy-5'-methylphenyl)benzotriazole used alone barely prevents polystyrene from discoloring due to light beyond the point of failure, i.e., a yellow index of 15.0.

Tables V and VI illustrate the strikingly improved and entirely unexpected degree of protection of polystyrene from yellowing that is obtained when the new composition of this invention is added to polystyrene in relatively minor amounts.

While the invention has been illustrated by a detailed description of certain specific embodiments, it is understood that various modifications and substitutions can be made in any of them within the scope of the appended claims which are also intended to include equivalents of such embodiments.

What is claimed is:

1. A composition of matter comprising polystyrene and from about 0.001% to about 5% by weight of said polystyrene of a stabilizer system comprising from 80% to 20% by weight of methyl 3-(3'-di-tert-butyl-4'-hydroxyphenyl)propionate and from 20% to 80% by weight of a compound of the formula

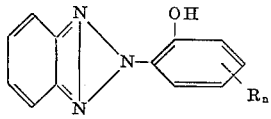

wherein R is hydrogen, lower alkyl, lower alkoxy, lower carbalkoxy, cyclohexyl, phenyl or halogen, and wherein $n$ is an integer of from 0 to 3.

2. A composition of matter comprising polystyrene and from about 0.001% to about 5% by weight of said polystyrene of a stabilizer composition comprising from 80% to 20% by weight of 2-(2'-hydroxy-5'-methylphenyl)benzotriazole and from 20% to 80% by weight of methyl 3-(3',5'-di-tert-butyl-4'-hydroxyphenyl)propionate.

3. A composition as claimed in claim 2 wherein said stabilizer composition is comprised of about 60% by weight of 2-(2'-hydroxy-5'-methylphenyl)benzotriazole and about 40% by weight of methyl 3-(3',5'-di-tert-butyl-4'-hydroxyphenyl)propionate.

4. A composition as claimed in claim 3 wherein said stabilizer composition is present from 0.1% to 1% by weight of said polystyrene.

References Cited
UNITED STATES PATENTS

| | | | |
|---|---|---|---|
| 3,178,489 | 4/1965 | Lunk et al. | 260—45.8 X |
| 3,247,240 | 4/1966 | Meier et al. | 260—45.85 X |
| 3,281,455 | 10/1966 | Steinberg | 260—45.85 X |
| 3,301,816 | 1/1967 | Burgess | 260—45.8 X |

DONALD E. CZAJA, *Primary Examiner.*

M. J. WELSH, *Assistant Examiner.*